United States Patent
Becker et al.

(10) Patent No.: US 8,061,228 B2
(45) Date of Patent: Nov. 22, 2011

(54) ACTUATOR FOR A MOTOR VEHICLE WITH A GEAR CASE

(75) Inventors: Burckhard Becker, Solingen (DE); Wilfried Beneker, Leichlingen (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 321 days.

(21) Appl. No.: 12/133,714

(22) Filed: Jun. 5, 2008

(65) Prior Publication Data

US 2008/0315652 A1 Dec. 25, 2008

(30) Foreign Application Priority Data

Jun. 19, 2007 (DE) .......................... 10 2007 028 620

(51) Int. Cl.
*F16H 1/16* (2006.01)
*F16H 1/20* (2006.01)
*B60N 2/02* (2006.01)
*B60N 2/48* (2006.01)

(52) U.S. Cl. ..................... 74/425; 297/362.11
(58) Field of Classification Search .................... 74/425, 74/89.14, 89.23; 384/2, 3, 154, 192; 297/362.11, 297/362.12
See application file for complete search history.

(56) References Cited

U.S. PATENT DOCUMENTS

| 2,092,180 | A | * | 9/1937 | Porter | 74/41 |
| 4,802,374 | A | * | 2/1989 | Hamelin et al. | 74/89.14 |
| 6,260,922 | B1 | | 7/2001 | Frohnhaus et al. | |
| 6,260,992 | B1 | * | 7/2001 | Tanabe et al. | 362/512 |
| 6,322,146 | B1 | * | 11/2001 | Fisher, Jr. | 297/362.14 |
| 2004/0022465 | A1 | * | 2/2004 | Fish | 384/192 |
| 2005/0126333 | A1 | * | 6/2005 | Dohles et al. | 74/606 R |
| 2006/0260424 | A1 | * | 11/2006 | Becker et al. | 74/89.23 |

FOREIGN PATENT DOCUMENTS

| DE | 1 755 740 A1 | 1/1972 |
| DE | 198 15 283 C2 | 10/1999 |
| DE | 103 53 245 A1 | 6/2005 |
| WO | WO 03/068551 A1 | 8/2003 |

* cited by examiner

*Primary Examiner* — Justin Krause
(74) *Attorney, Agent, or Firm* — McCarter & English, LLP

(57) ABSTRACT

The actuator for a motor vehicle has an electric motor having an output shaft. A gear comprising a spindle nut and a gear case is connected to the output shaft. A spindle engages the spindle nut. A bracket forms an at least partial surrounding grip abut the gear case. A pivot bearing is provided between the gear case and the bracket. Further, an abutment lying substantially opposite the pivot bearing is formed between the gear case and the bracket.

29 Claims, 2 Drawing Sheets

ACTUATOR FOR A MOTOR VEHICLE WITH A GEAR CASE

CROSS-REFERENCE TO RELATED APPLICATIONS

This application claims priority to German Application No. DE 10 2007 028 620.3, filed Jun. 19, 2007, which is hereby incorporated by reference in its entirety as part of the present disclosure.

BACKGROUND OF THE INVENTION

The invention relates to an actuator for a motor vehicle, more specifically for a motor vehicle seat, with an electric motor having an output shaft, with a gear comprising a worm, a spindle nut and a gear case and being connected to the output shaft, with a spindle engaging the spindle nut and with a bracket surrounding at least partially the gear case.

Such an actuator has been previously known from WO 03/068551 A1, a similar actuator also appears from DE 103 53 245 A1. The bracket fixes the gear case and absorbs the reaction forces of the actuator. The gear case may thereby be pivoted relative to the bracket about an axis defined by the axis of the spindle.

In principle, such type actuators have proved efficient. They are utilized in many motor vehicles. The reader is additionally referred to the prior art documents DE 1 755 740 A1, U.S. Pat. No. 6,260,922 B1 and DE 198 15 283 C2.

It has been found out that the movement of the gear case relative to the bracket is not sufficient and that in some cases it is not even necessary. Requirements during mounting and practical use of the actuator make it necessary to compensate for inaccuracies and differences. If these are not compensated for, the gear case may get jammed with respect to the bracket, or in any case will move with difficulty. It is also of benefit to have sufficient freedom for adjustment movements. Additionally, it is desired that the gear case be capable of moving with respect to the bracket with as little friction as possible.

Therefore, it is at least one objective of the invention to provide for more possibilities for the gear case to move relative to the bracket, with as little friction as possible, so that finally the torque provided by the electric motor is best used for the drive.

SUMMARY OF THE INVENTION

The above objective is achieved by an actuator for a motor vehicle comprising an electric motor having an output shaft, a gear connected to the output shaft and comprising a spindle nut and a gear case, a spindle engaging the spindle nut, and a bracket forming, at least partially, a surrounding grip about the gear case. A pivot bearing is provided between the gear case and the bracket, and an abutment lying substantially opposite the pivot bearing is formed between gear case and bracket.

The gear case can move about the pivot bearing relative to the bracket. It thereby moves in at least one direction, more specifically in the direction determined about the axis of the worm by a radial plane. If only this degree of freedom is desired, it is sufficient to configure the pivot bearing with a linear bearing, the joint axis of this joint extending parallel to the axis of the worm. The worm is connected to the output shaft of the electric motor, in particular through a flexible shaft.

An additional freedom of movement in a direction parallel to the worm axis is advantageous. This additional freedom of movement may also be provided independent of the freedom of movement discussed in the previous paragraph, meaning of the movement occurring in a radial plane of the worm. It is thereby respectively assumed that the worm axis extends at right angles with respect to the axis of the spindle.

Another possibility is to dispose the worm at an angle of less than 90°, e.g., of between 85° and 5°, with respect to the spindle axis. In this case in particular, it is of greater benefit to describe the freedom of movement of the gear case with respect to the bracket, in regard to the bracket. The bracket forms a more or less completely surrounding grip around the gear case accordingly has an encompassing plane. The one freedom of movement lies in this encompassing plane, the other freedom of movement at right angles thereto. Generally, the spindle may tilt about the one and/or the other axis, with the spindle preferably tilting in a cone angle range, with the apex of the cone coinciding with the pivot bearing.

Between bracket and gear case, the pivot bearing allows for a movement that causes little friction. On the side opposite the pivot bearing there is located the abutment. In the region of the abutment there occurs a relative movement between bracket and gear case, this being the reason why the abutment is preferably configured to be a sliding bearing. Further, it is configured to have a shape allowing for a relative movement, more specifically with as little friction as possible, to occur.

In a preferred developed implementation, a first passage for the spindle is provided in the bracket, in proximity to the pivot bearing. This first passage is only of slightly greater dimensions than the diameter of the spindle since the only movement the spindle performs relative to the first passage is a tilting movement, the center of this tilting movement virtually coinciding with the first passage. As a result, the spindle only moves very little toward the boundary of the first passage and away therefrom.

In proximity to the abutment there is preferably provided a second passage for the spindle in the bracket. In this second passage, there occurs a quite big movement of the spindle with respect to the second passage, so that the second passage must be sufficiently oversized at least in the one pivoting direction provided, preferably in both pivoting directions of the spindle, with pivot angles ranging from 5° to 15° and corresponding cone angles of the same dimensions having proved efficient.

The pivot bearing is preferably implemented in the form of a hinge joint or of a point bearing. For an implementation as a point bearing, a carried spherical surface or an interposed ball may be used. For implementing the hinge joint as a conical bearing, an apex of the one part is considered, which is carried in a corresponding depression in the other part.

The plain bearing forming the abutment is configured to be adapted to the configuration of the pivot bearing. It is either partially cylindrical or partially spherical for example. In the region of the plain bearing, gear case and bracket touch each other by their surfaces, a contact surface is formed. This contact surface preferably has a size of a few square millimetres, for example less than 10 square millimetres, preferably less than 30 square millimetres. Preferably, the contact surface is configured to be small. The gear case and the bracket only contact each other in the pivot bearing and in the abutment. Besides, between the gear case and the bracket there is substantially an air gap.

In a preferred developed implementation, the bracket has fastening means. These fastening means serve for fastening the bracket and as a result thereof the actuator to a part of the motor vehicle or of the motor vehicle seat, for example an arm of a joint to be adjusted, such as a seat back hinge.

In a preferred developed implementation, a spindle nut is located between the abutment and the pivot bearing. The pivot bearing is thereby quite near the one end of the spindle nut. The abutment is quite near the other end of the spindle nut. The respective distance is no more than 3, preferably no more than 10 or 20 mm.

BRIEF DESCRIPTION OF THE DRAWINGS

Other features and advantages will become more apparent upon reviewing the appended claims and the following non restrictive description of embodiments of the invention, given by way of example only with reference to the drawing. In the drawing:

DETAILED DESCRIPTION OF THE INVENTION

Figure 1:
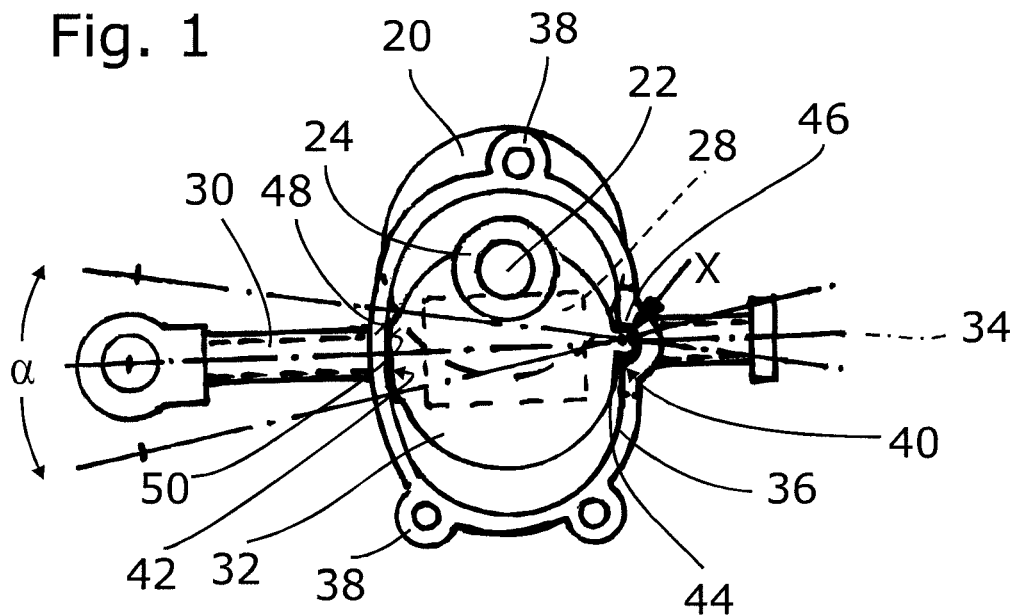
FIG. 1: shows a simplified front view of an actuator of the invention.
Figure 2:
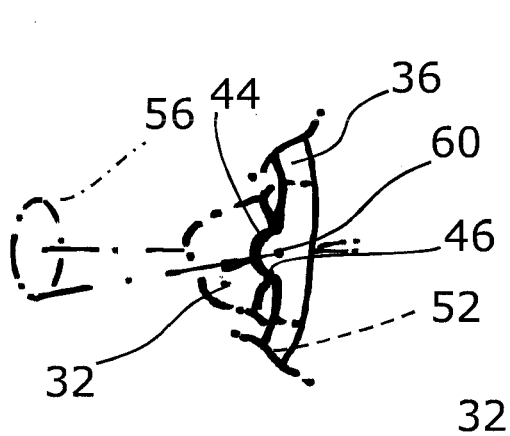
FIG. 2: shows an enlarged representation of detail X of FIG. 1, but in an implementation different from the one in FIG. 1.
Figure 3:
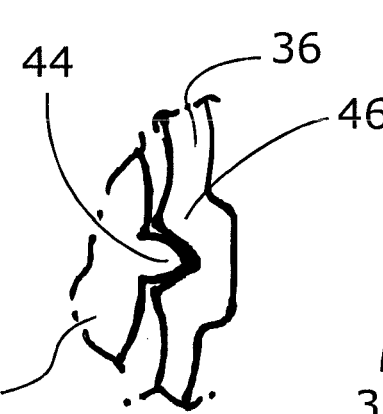
FIG. 3: shows an enlarged representation of detail X of FIG. 1, but in an implementation different from the one in FIG. 1.
Figure 4:
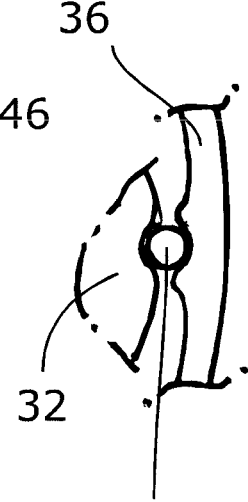
FIG. 4: shows an enlarged representation of detail X of FIG. 1, but in an implementation different from the one in FIG. 1.
Figure 5:
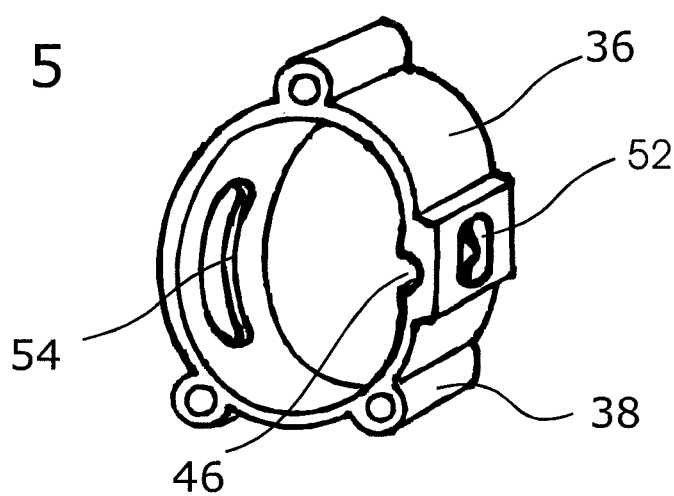
FIG. 5: shows a perspective representation of a bracket as used in FIG. 1.

FIGS. 1 and 5 show a first exemplary embodiment, three additional implementations are shown and outlined in FIGS. 2, 3 and 4, each time only in the detail of major interest herein, namely the configuration of the pivot bearing. Accordingly, the first exemplary embodiment will be essentially discussed, the other exemplary embodiments being only discussed if they differ from the first exemplary embodiment.

An electric motor 20 having an output shaft 22 is shown. In the illustration shown in FIG. 1, the output shaft extends at right angles to the plane of the paper. Between the electric motor 20 and the output shaft 22, it is possible to dispose a gear and/or a flexible shaft or something similar. The output shaft 22 is non-rotatably connected to a worm 24 having a worm axis that extends at right angles with respect to the plane of the paper. The worm 24 meshes with a worm gear of a spindle nut 28 which in turn carries an internal thread engaging a spindle 30. The described gear parts are located within a gear case 32. The spindle 30 protrudes freely from either side of this gear case 32. At its end regions, it has fastening means. The spindle 30 is non-rotatable, when driven by the electric motor 20, it moves in the direction of its axis 34.

A bracket 36 forms a surrounding grip around the gear case 32, the bracket being substantially tubular in the exemplary embodiment. It has three fastening regions 38 that are provided with holes, in the fastening regions 38, the bracket 36 can be connected to parts of the motor vehicle, more specifically of the motor vehicle seat (both not shown), in order to be capable of absorbing the reaction forces.

The parts described hitherto are prior art. Accordingly, they need not be described in detail since they are well known from previous publications. The invention will now be discussed in detail herein after:

Between the bracket 36 and the gear case 32 there is configured a pivot bearing 40 on the one side and an abutment 42 on the other side. Both are located in proximity to the respective end surfaces of the spindle nut 28. They are additionally located in proximity to the spindle 30. Preferably, and as can be seen from FIG. 5, the pivot bearing 40 and/or the abutment 42 are substantially symmetrical with respect to a plane in which lies the spindle 30 and which is defined by the surrounding plane of the bracket 36 (in FIG. 1, this plane is the plane of the paper).

The pivot bearing 40 will be discussed herein after. It is configured either as a kind of hinge joint as shown in the first exemplary embodiment, meaning that it has a joint axis that extends at right angles to the plane of the drawing in FIG. 1. For this purpose, the gear case 32 has an elongate nose 44 of a round cross section pointing toward the bracket 36; it extends at right angles to the plane of the paper. A receiving recess 46 conforming to the shape of the nose and corresponding thereto forms a bracket 36 and is open toward the spindle nut 28. Thanks to this pivot bearing 40, a pivotal movement about the angle alpha is possible.

The abutment 42 lies opposite, more particularly diametrically opposite, the pivot bearing 40. The abutment 42 has two surfaces lying on a jacket, the axis of the jacket coinciding, at least substantially, with the axis of the pivot bearing 40. The first surface 48 is formed on the external face of the gear case 32. The second surface 50 is located on the inner wall of the bracket 36. Both surfaces 48, 50 lie against each other and are configured such that the friction is low and the pivotal movement about the angle alpha possible.

In a well known way, the bracket 36 has a first passage 52 for the spindle 30. This first passage 52 is provided in immediate proximity to the pivot bearing 40. It breaks the pivot bearing 40 into two halves. The passage 52 is substantially the size of the diameter of the spindle 30. Within the first passage 52 only a nodding or tilting movement of the spindle 30 substantially occurs, this being the reason why the first passage 52 is a long hole having its longitudinal direction in the plane of the surrounding grip of the bracket 36. In the direction transverse thereto, the first passage 52 only needs to be slightly wider than the outer diameter of the spindle 30.

A second passage 54 lies diametrically opposite the first passage 52 and is also formed in the bracket 36. This second passage 54 is provided in immediate proximity to the abutment 42. It is located in the center of the abutment 42 which it divides into two halves. Due to the pivot range, the dimensions of the second passage 54 are much larger than those of the first passage 52. As best shown in FIG. 5, the second passage 54 has, in the plane of the surrounding grip of the bracket 36, a length that corresponds approximately to three times the diameter of the spindle 30. In the direction transverse thereto, the dimensions of the second passage 54 only need to be slightly larger than the diameter of the spindle 30.

Preferably, the bracket 36 is elastically biased to abut the gear case 32, meaning it clamps it with sufficient retaining force between its two ends.

Whilst in the first exemplary embodiment the pivot bearing 40 has a defined pivot axis extending at right angles to the plane in FIG. 1, pivotal movement is also additionally possible within the pivot bearing 40 in the embodiment shown in FIG. 2 where the left end (in FIG. 1) of the spindle 30 is caused to pivot out of the plane of the paper in the upward direction and into the plane of the paper in the downward direction. Accordingly, a pivot range within a cone and about an apex 60 is generally possible, the base 56 of the cone being outlined in FIG. 2. The description of the conical range shall only serve for explanation. The pivoting path may be longer or shorter in the one direction than in the transverse direction, it may also be asymmetrical so that it no longer has the shape of a cone.

Figure 6:
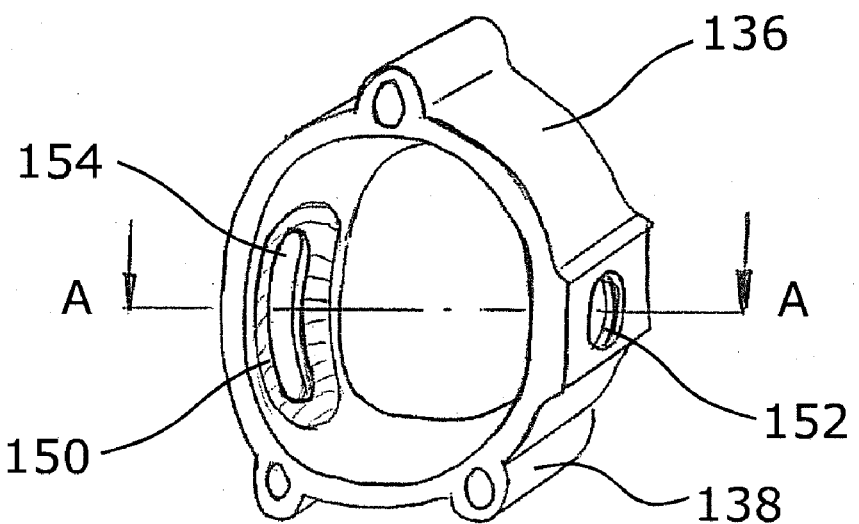
FIG. 6: shows a perspective representation of a another bracket used in the invention.

A pivotal movement also in the direction transverse to the pivotal movement the first exemplary embodiment allows for is achieved in FIG. 2 by the fact that the first surface 48 is configured to be spherical, with the second surface 50 being configured to be part of a hollow sphere as in the bracket shown in FIG. 6. The configuration corresponding to FIG. 4, namely that of a ball between the gear case 32 and the bracket 36, is of particular benefit for the pivot bearing 40, this ball defining the pivot bearing 40. A conical bearing is also possible for the pivot bearing 40 as shown in FIG. 6.

Figure 7:
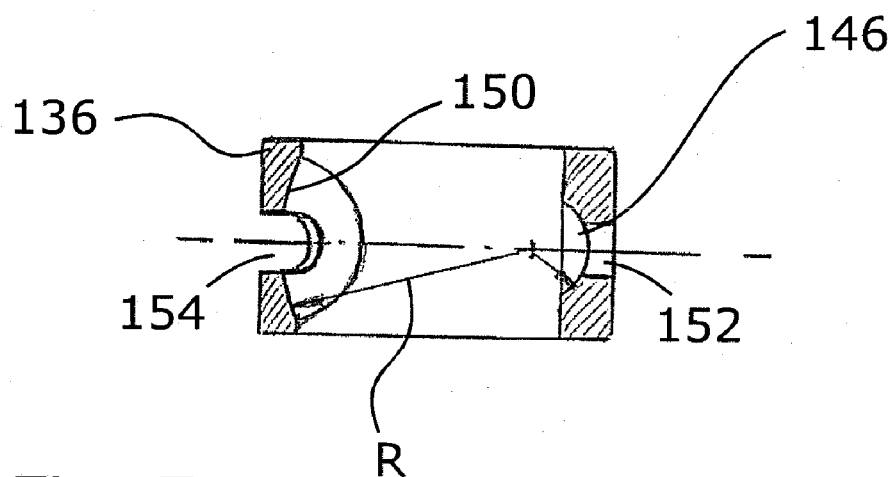
FIG. 7: shows a cross-sectional view of the bracket of FIG. 6 taken along line A-A.

FIGS. 6 and 7 show said alternative embodiment of a bracket 136 having said spherical second surface 150 and providing a conical pivot bearing via the recess 146. Being spherical, the second surface 150 inherently defines a radius R. As discussed just above, the alternative pivot bearings of the embodiments of FIG. 2 and FIG. 4 both cooperate with the second surface to achieve the conical range.

In the configuration according to FIG. 3, a pivotal movement about the pivot angle alpha like in the first exemplary embodiment is achieved. Now, the pivot bearing 40 is no longer configured to be partially cylindrical; here, the bearing is conical. The receiving recess 46 is substantially implemented in the shape of a V-shaped groove that extends transverse to the plane of the paper. The nose 44 is of an almost triangular cross section and has an apex; it also extends at right angles to the plane of the paper. The apex engages the deepest point of the groove. As a result, the pivot bearing achieved involves less friction than in the first exemplary embodiment. The first passage 52 divides the projection into two portions. A corresponding passage for the spindle 30 in the gear case divides the nose 44 into two portions. The abutment is configured like in the first exemplary embodiment.

In the exemplary embodiment shown in FIG. 4, at least one rolling body, for example in the form of a cylinder or a barrel, is interposed between gear case 32 and bracket 36. Preferably, such a rolling body is respectively disposed on the one and on the other side of the first passage 52. As a result, a pivot joint similar to the one in the first exemplary embodiment is achieved, this time however with a separate intermediate piece.

As already explained herein above, FIG. 4 may also be understood such that a ball (and not a rolling body) is provided between gear case 32 and bracket 36. Like in the second exemplary embodiment, this ball may be provided only once, meaning only on one side of the first passage 52 and in the proximity thereof. In this case, no corresponding pivot bearing is provided on the other side of the first passage.

What is claimed is:

1. An actuator for a motor vehicle seat comprising:
   an electric motor having an output shaft;
   a transmission connected to the output shaft and comprising a spindle nut, a worm and a gear case;
   a spindle engaging the spindle nut; and
   a bracket forming, at least partially, a surrounding grip about the gear case, wherein a pivot bearing is provided between the gear case and the bracket, the pivot bearing defining a pivot axis of the gear case that is offset from a center of the bracket, and an abutment lying substantially opposite the pivot bearing is formed between the gear case and bracket.

2. The actuator as set forth in claim 1, wherein the abutment is configured to be a plain bearing.

3. The actuator as set forth in claim 2, wherein the abutment comprises a curved surface.

4. The actuator as set forth in claim 3, wherein the curved surface is at least partially spherical.

5. The actuator as set forth in claim 1, wherein a first passage for the spindle is formed in the bracket in proximity to the pivot bearing.

6. The actuator as set forth in claim 1, wherein a first passage dividing the pivot bearing into two parts is formed in the bracket.

7. The actuator as set forth in claim 1, wherein a second passage in the bracket is provided in proximity to the abutment.

8. The actuator as set forth in claim 7, wherein the second passage is located in the center of the abutment.

9. The actuator as set forth in claim 7, wherein the spindle has a spindle diameter and the second passage has an opening that is at least about 50% larger than the spindle diameter, the second passage having, in a radial plane about the axis of the output shaft, a dimension that is at least about 100% larger than the diameter of the spindle.

10. The actuator as set forth in claim 7, wherein the second passage defines a dimension in a direction extending parallel to the axis of the output shaft of at least about 50% larger than the diameter of the spindle.

11. The actuator as set forth in claim 7, wherein the second passage defines a dimension in a direction extending parallel to the axis of the output shaft, the dimension being at least about 100% larger than the diameter of the spindle.

12. The actuator as set forth in claim 1, wherein the pivot axis extends parallel to an axis of the worm.

13. The actuator as set forth in claim 1, wherein the bracket comprises fastening means for securing the bracket to a part of the motor vehicle seat, the fastening means comprising fastening regions of the bracket having holes and configured for directly connecting the bracket to the vehicle seat part.

14. The actuator as set forth in claim 1, wherein the transmission comprises a spindle nut located between the abutment and the pivot bearing.

15. The actuator as set forth in claim 1, wherein outside of the pivot bearing and outside of the abutment there is an air gap between the bracket and the gear case.

16. The actuator as set forth in claim 1, wherein the pivot bearing and the abutment define an axis passing through both the pivot bearing and the abutment that is substantially aligned with an axis of the spindle.

17. The actuator as set forth in claim 1, wherein an axis of the spindle passes through one of the pivot axis and a pivot point of the pivot bearing.

18. The actuator as set forth in claim 1, wherein the bracket defines a first passage for the spindle in proximity to the pivot bearing and a second passage for the spindle in proximity to the abutment, wherein the second passage is larger than the first passage.

19. The actuator as set forth in claim 1, wherein the bracket is formed from one piece.

20. The actuator as set forth in claim 19, wherein the one piece bracket forms the pivot bearing and the abutment.

21. The actuator of claim 1, wherein the abutment is defined by a first surface defined by the gear case and a second surface defined by the bracket, wherein the first and second surfaces are in contact with each other during relative movement thereof.

22. An actuator for a motor vehicle seat comprising:
   an electric motor having an output shaft;
   a transmission connected to the output shaft and comprising a spindle nut, a worm and a gear case;

a spindle engaging the spindle nut; and a bracket forming, at least partially, a surrounding grip about and contacting the gear case, wherein a pivot bearing is provided between the gear case and the bracket, and an abutment lying substantially opposite the pivot bearing is formed between the gear case and bracket, wherein, in a fully assembled state, the gear case is adjustable relative to the bracket in a first direction and a second direction that is transverse to the first direction.

23. An actuator for a motor vehicle seat comprising:

an electric motor having an output shaft;

a transmission connected to the output shaft and comprising a spindle nut, a worm and a gear case;

a spindle engaging the spindle nut; and a bracket forming, at least partially, a surrounding grip about the gear case, wherein a pivot bearing is provided between the gear case and the bracket, and an abutment lying substantially opposite the pivot bearing is formed between the gear case and bracket, wherein the pivot bearing defines a pivot axis about which the gear case pivots relative to the bracket extending at right angles to the axis of the worm and to the axis of the spindle nut.

24. The actuator of claim 23, wherein the gear case has a pivot angle about the pivot axis of about 5 degrees to 15 degrees.

25. An actuator for a motor vehicle seat comprising:

an electric motor having an output shaft;

a transmission connected to the output shaft and comprising a spindle nut, a worm and a gear case;

a spindle engaging the spindle nut; and a bracket forming, at least partially, a surrounding grip about the gear case, wherein a pivot bearing is provided between the gear case and the bracket, and an abutment lying substantially opposite the pivot bearing is formed between the gear case and bracket, wherein the bracket is elastically biased into abutment with the gear case.

26. An actuator for a motor vehicle seat comprising:

an electric motor having an output shaft;

a transmission connected to the output shaft and comprising a spindle nut, a worm and a gear case;

a spindle engaging the spindle nut; and a bracket forming, at least partially, a surrounding grip about the gear case, wherein a pivot bearing is provided between the gear case and the bracket, and an abutment lying substantially opposite the pivot bearing is formed between the gear case and bracket, wherein the gear case is adjustable relative to the bracket in a multi-axial conical movement and the pivot bearing defines the apex of the conical range.

27. An actuator for a motor vehicle seat comprising:

an electric motor having an output shaft;

a transmission connected to the output shaft and comprising a spindle nut, a worm and a gear case;

a spindle engaging the spindle nut; and a bracket forming, at least partially, a surrounding grip about the gear case, wherein a pivot bearing is provided between the gear case and the bracket, and an abutment lying substantially opposite the pivot bearing is formed between the gear case and bracket, wherein the bracket has fastening regions having holes and configured for directly connecting the bracket to the vehicle seat part such that actuator reaction forces can directly be absorbed by the vehicle seat.

28. The actuator of claim 27, wherein the bracket defines a surrounding plane in which the spindle lies.

29. The actuator of claim 28, wherein the holes are located in the surrounding plane.

* * * * *